United States Patent
Wang et al.

(10) Patent No.: US 8,068,552 B2
(45) Date of Patent: Nov. 29, 2011

(54) METHOD AND SYSTEM FOR ACHIEVING SPATIAL DIVERSITY OF A WIRELESS COMMUNICATIONS NETWORK

(75) Inventors: Genyuan Wang, Plano, TX (US); Hang Jin, Plano, TX (US); Hanqing Lou, Garland, TX (US); Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 807 days.

(21) Appl. No.: 12/035,033

(22) Filed: Feb. 21, 2008

(65) Prior Publication Data
US 2008/0205539 A1    Aug. 28, 2008

Related U.S. Application Data

(60) Provisional application No. 60/902,694, filed on Feb. 22, 2007.

(51) Int. Cl.
*H04B 7/02* (2006.01)
*H04L 1/02* (2006.01)
(52) U.S. Cl. .................................... 375/267; 375/295
(58) Field of Classification Search .................. 375/260, 375/267, 295
See application file for complete search history.

(56) References Cited

U.S. PATENT DOCUMENTS

| | | | |
|---|---|---|---|
| 6,795,424 B1 | 9/2004 | Kapoor et al. | |
| 6,862,271 B2* | 3/2005 | Medvedev et al. | 370/329 |
| 7,554,952 B2* | 6/2009 | Kogiantis et al. | 370/334 |
| 2006/0109923 A1 | 5/2006 | Cai et al. | |
| 2008/0144733 A1* | 6/2008 | ElGamal et al. | 375/267 |

FOREIGN PATENT DOCUMENTS

EP    1530388 A1    5/2005

OTHER PUBLICATIONS

International Search Report and Written Opinion cited in PCT/US2008/054543 dated Aug. 14, 2008.

* cited by examiner

*Primary Examiner* — Chieh M. Fan
*Assistant Examiner* — Freshteh N Aghdam
(74) *Attorney, Agent, or Firm* — Edell, Shapiro & Finnan, LLC

(57) ABSTRACT

A method and system are provided for achieving spatial diversity of a wireless communications network. The method comprises arranging antennas on a transmitting wireless station into a plurality of antenna subgroups, wherein each of the antenna subgroups forms a virtual antenna, creating a plurality of beamformed MIMO channels using the plurality of virtual antennas, wherein each of the beamformed MIMO channel comprises a plurality of sub-carriers and corresponds to a virtual antenna, dividing sub-carriers in each of the plurality of beamformed MIMO channels into at least a first and second cluster, distributing a first amount of transmitting power to the first cluster and a second amount of transmitting power to the second cluster, wherein the first amount of transmitting power is substantially larger than the second amount of transmitting power.

14 Claims, 4 Drawing Sheets

METHOD AND SYSTEM FOR ACHIEVING SPATIAL DIVERSITY OF A WIRELESS COMMUNICATIONS NETWORK

CROSS REFERENCE TO RELATED APPLICATIONS

The present application claims the benefit of U.S. Provisional Application Ser. 60/902,694, which was filed on Feb. 22, 2007, the entire contents of which is hereby incorporated by reference.

BACKGROUND

Equipping wireless stations with multiple antennas is one of the widely adopted methods to increase the channel capacity of a wireless communications network. The multiple antennas on a transmitting and a receiving wireless station enable the two wireless stations to establish a multiple-input-multiple-output (MIMO) channel.

Various techniques, such as beamforming, space-time coding (STC), and cyclic delay diversity (CDD), have been developed to utilize MIMO channels. In order to establish a beamformed MIMO channel, a transmitting wireless station must acquire accurate channel state information about a destination wireless station. However, even without obtaining accurate channel state information, STC and CDD can fully utilize the multiple antennas on a wireless station to increase diversity of a MIMO channel.

All the MIMO techniques described above have limitations. When STC is applied to an antenna array of more than two antennas, the symbol rate is reduced. In addition, CDD may fail to achieve transmit diversity if cyclic delays are not selected properly. Specifically, the desired performance of a CDD transmission scheme (i.e., high transmit diversity and high symbol rate) depends on the selection of cyclic delays and channel estimation when there are limited pilot signals available.

A beamforming technique becomes ineffective when channel state information is not available or when a broadcast beamformed MIMO channel is created. A wireless communications network using beamforming may have a lower utilization rate because the acquisition of channel state information consumes channel resources and thus reduces the available channel capacity. For example, a transmitting wireless station can obtain downlink channel information based on channel information carried in uplink sounding signals and/or uplink traffic. The overhead resulting from the transmission of the uplink sounding signals limits the number of wireless stations that a wireless communications network can support. Because the channel condition between a mobile station and a base transceiver station is unique. It is almost impossible to obtain suitable beamforming weighting vectors to create a broadcast beamformed MIMO channel.

To deal with the limitations associated with individual MIMO techniques, a wireless communications network may utilize a variety of MIMO techniques to fully utilize the multiple antennas on a wireless station. Incorporating different MIMO techniques can improve the performance of a wireless communications network with or without channel information.

DETAILED DESCRIPTION

The following detailed description refers to the accompanying drawings. The description includes non-limiting examples of embodiments.

Overview

Disclosed herein is a method and system for achieving spatial diversity of a wireless communications network. The method comprises arranging antennas on a transmitting wireless station into a plurality of antenna subgroups, wherein each of the antenna subgroups forms a virtual antenna, creating a plurality of beamformed MIMO channels using the plurality of virtual antennas, wherein each of the beamformed MIMO channel comprises a plurality of sub-carriers and corresponds to a virtual antenna, dividing sub-carriers in each of the plurality of beamformed MIMO channels into at least a first and second cluster, distributing a first amount of transmitting power to the first cluster and a second amount of transmitting power to the second cluster, wherein the first amount of transmitting power is substantially larger than the second amount of transmitting power.

The method and system described herein improve the transmit diversity of a wireless communications network without using channel state information. In such a system, the antennas of an antenna array are organized into antenna subgroups comprising a plurality of antennas. More specifically, an antenna weighting scheme, in conjunction with a channel coding scheme (e.g., cyclic delay diversity, omni-directional beamforming, and pre-coding), provides spatial diversity without relying on the availability and accuracy of channel state information.

In a wireless communications network adopting an OFDM modulation scheme, a broadband wireless channel is divided into narrowband sub-carriers. The sub-carriers are grouped into clusters, and each cluster comprises one or more sub-carriers. In one embodiment, the transmitting power is not equally allocated to the clusters. Specifically, one of the clusters has a significantly higher transmitting power than the others, and it is referred to as a "prominent cluster."

Figure 1:
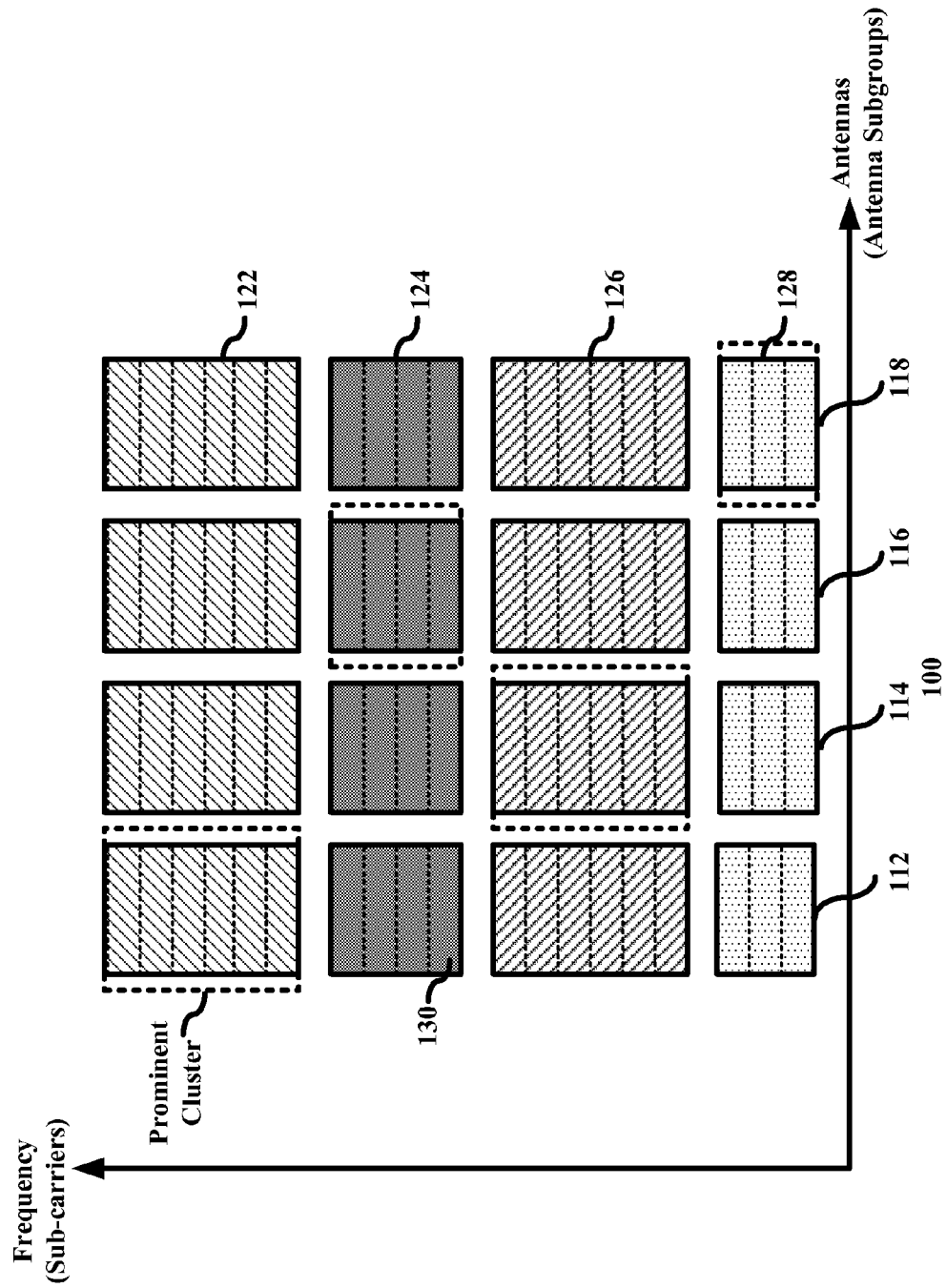
FIG. 1 presents an example of a frequency vs. antennas diagram to illustrate aspects of the system and method described herein.

FIG. 1 presents a frequency vs. antennas diagram 100. The antennas on a wireless station are organized into four antenna subgroups 112, 114, 116 and 118 in accordance with a first predetermined rule that is based on the correlations of receiving signals or relative positions among the antennas. In one embodiment, the first predetermined rule involves dividing the antennas equally into four groups based on their locations.

A data stream transmitted by each of the antenna subgroups is modulated onto a broadband channel comprising four frequency bands or clusters 122, 124, 126 and 128. Each cluster comprises a plurality of sub-carriers 130. Cluster 122, enclosed in dashed lines, has the highest transmitting power and it is the prominent cluster for antenna subgroup 112. Similarly, cluster 126 is the prominent cluster for antenna subgroup 114.

Figure 2:
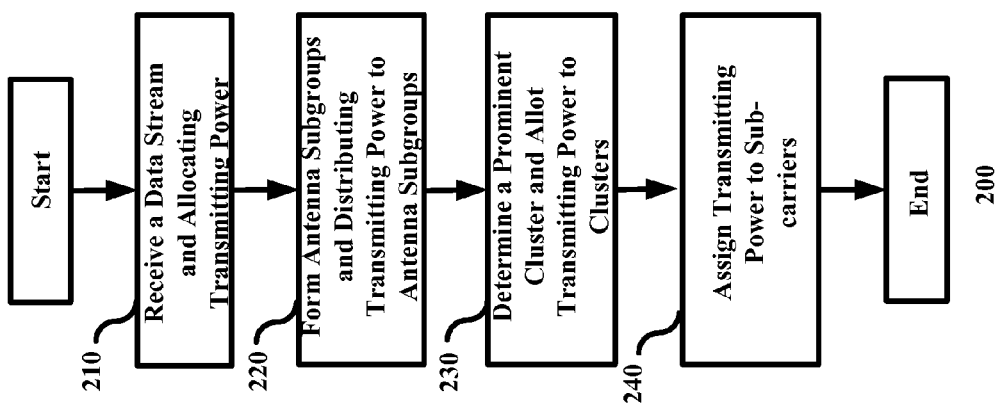
FIG. 2 presents an example of a flow diagram for a method for improving the transmit diversity of a wireless communications network in accordance with one embodiment.

FIG. 2 presents an example of a flow diagram illustrating a method for improving the transmit diversity of a wireless communications network in accordance with one embodiment. In step 210, a data stream enters a BTS. The data stream is encoded after it passes through a channel coding module, an interleaver module, and a modulation module. Subsequently, the encoded data stream is sent to a transmitting module which includes a beamforming module, CDD or precoding module, a channel coding module and an antenna array. A predetermined amount of transmitting power is allocated to the transmission of the encoded data stream.

Step 220 begins with the arranging of the antennas on the BTS into antenna subgroups, as shown in FIG. 1, based on the first predetermined rule. Each antenna subgroup acts as a single virtual antenna on the BTS. The BTS computes beamforming weighting vectors for each of the virtual antennas and creates beamformed MIMO channels. For each antenna subgroup, the data stream is further encoded with a CDD or pre-coding scheme to achieve higher diversity. Next, the transmitting power allocated for the transmission of the encoded data stream is further distributed to antenna subgroups in accordance with a first predetermined weighting function. In one embodiment, the first predetermined weighting function is an equal distribution function distributing the transmitting power equally to all antenna subgroups.

For each antenna subgroup, a wireless channel is first divided into clusters comprising a plurality of sub-carriers in accordance with a second predetermined rule. Then a prominent cluster is determined among the clusters in such a way that no prominent clusters of adjacent antenna subgroups are the same. The transmitting power distributed to each antenna subgroup is further allotted to clusters in accordance with a second predetermined weighting function (step 230). The second predetermined weighting function ensures that a dominant weight is assigned to the prominent cluster for each antenna subgroup. The change in weights among clusters results in high selectivity signals transmitted from the antenna subgroups. In one embodiment, the second predetermined weighting function allots 90% of the transmitting power to a prominent cluster and the remaining 10% allotted to the remaining clusters. Specifically, the transmitting power of the prominent cluster is nine times as much as the aggregate transmitting power of the other clusters.

Subsequently, the transmitting power allotted to a cluster is further assigned to the sub-carriers in the cluster in accordance with a third predetermined weighting function (step 240). The design of the third predetermined weighting function ensures that the receiving wireless station achieves high-quality channel estimation.

Figure 3:
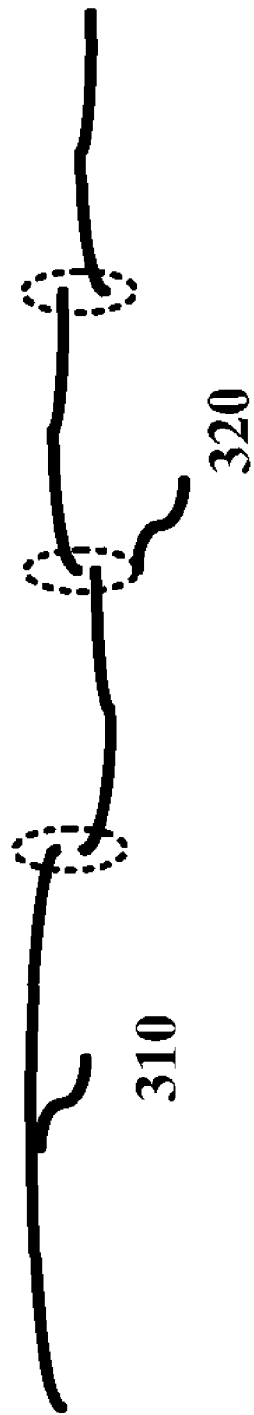
FIG. 3 illustrates a design principle of a third predetermined weighting function useful in connection with the system and method described herein.

FIG. 3 illustrates a design principle of the third predetermined weighting function that assigns the transmitting power to the sub-carriers in a cluster. The third predetermined weighting function is defined by an intra-cluster distribution curve 310, illustrating an unequal distribution of transmitting power among sub-carriers. Ideally, the intra-cluster variation in transmitting power is small. At the joint of every two clusters, the amount of the transmitting power of the sub-carrier on a first cluster is ideally similar to, if not the same as, that of the transmitting power of the adjacent sub-carrier on a second cluster. In other words, the inter-cluster variation in transmitting power, shown as a dash ellipse 320, should be as small as possible. More specifically, a small variation in a frequency band or sub-channel (i.e., inter-cluster and intra-cluster variation) guarantees high quality of channel estimation obtained by the receiving wireless station.

Figure 4:
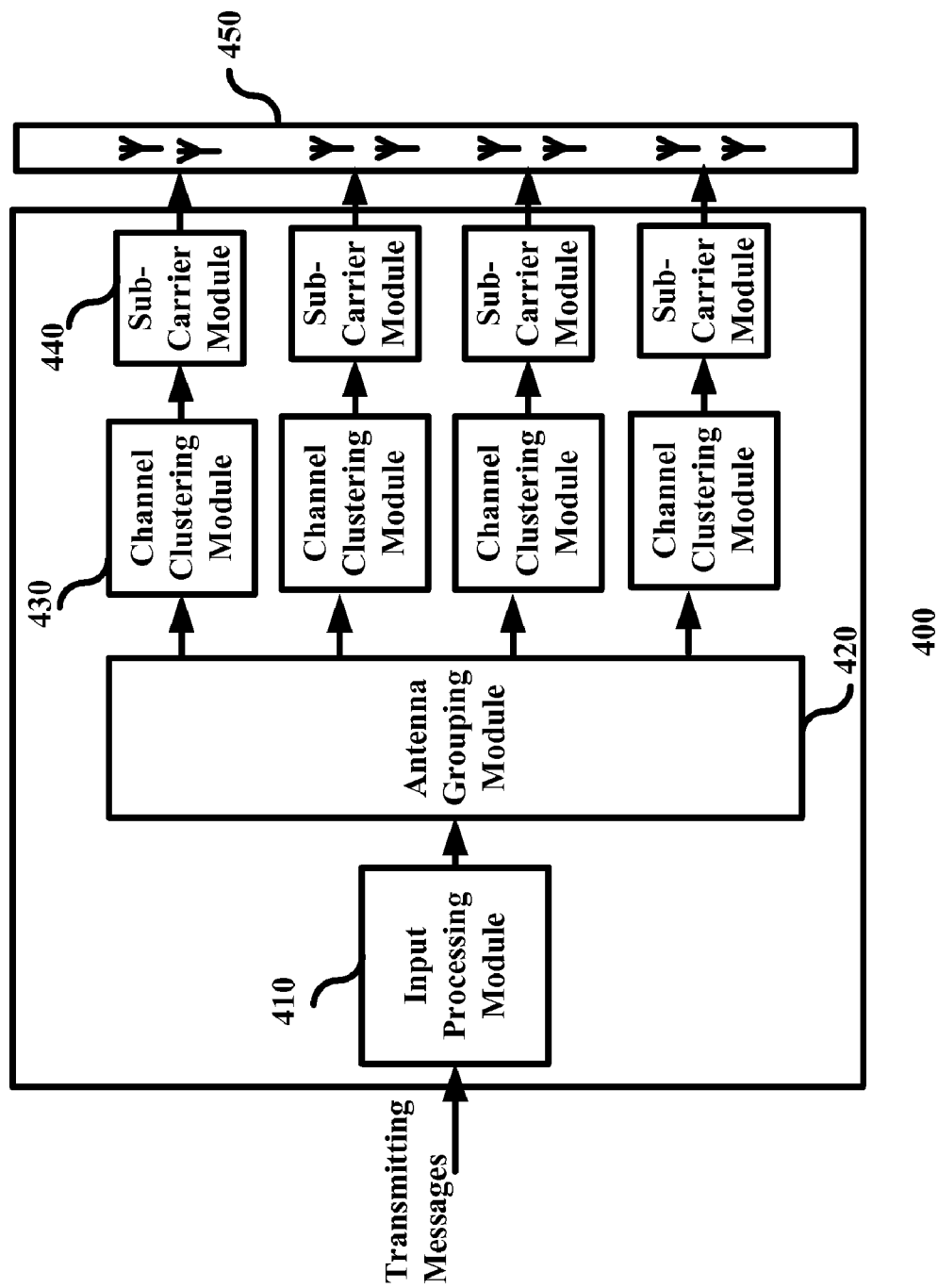
FIG. 4 illustrates an example of a system diagram of a wireless communications network in accordance with one embodiment.

FIG. 4 illustrates an example of a system diagram of a wireless communications network in accordance with one embodiment. A wireless communications network 400 comprises an input processing module 410, an antenna grouping module 420, channel clustering modules 430, sub-carrier modules 440, and an antenna array 450. The input processing module 410 includes a channel coding module, an interleaver module, and a modulation module. The antenna grouping module 420 includes a beamforming module and a CDD or pre-coding module.

The input processing module 410 encodes a data stream which enters a BTS. A predetermined amount of transmitting power is then allocated for the transmission of the encoded data stream. Next, the antenna grouping module 420 arranges the antennas on the BTS into antenna subgroups, referring to FIG. 1, based on a first predetermined rule. In addition, the antenna grouping module 420 computes beamforming weighting vectors for each of the antenna groups and creates beamformed MIMO channels. For each antenna subgroup, the data stream is further encoded with a CDD or pre-coding scheme to achieve higher diversity. The transmitting power is distributed to the antenna subgroups in accordance with a first predetermined weighting function.

The channel clustering module 430 divides a wireless channel into clusters in accordance with a second predetermined rule. Then, it determines a prominent cluster for each antenna subgroup in such a way that no prominent clusters of adjacent antenna subgroups are the same. The transmitting power distributed to each antenna subgroup is further allotted to clusters in accordance with a second predetermined weighting function. The second predetermined weighting function ensures that a dominant weight is assigned to the prominent cluster in each antenna subgroup.

The sub-carrier module 440 assigns transmitting power to sub-carriers in each cluster in accordance with a third predetermined weighting function. The design of the third predetermined weighting function ensures that the receiving wireless station can obtain high-quality channel estimation. After the completion of the three-tier transmitting power distribution, the data stream is then transmitted via the antenna array 450.

The foregoing provides many different embodiments for implementing different features of the system and method described herein. Specific examples of components and processes are merely examples and are not intended to be limiting.

What is claimed is:

1. A method comprising:
grouping antennas on a transmitting wireless station into a plurality of antenna subgroups, wherein each of the antenna subgroups forms a virtual antenna;
modulating a data stream for transmission via each antenna subgroup in a wireless channel comprising a plurality of clusters each comprising a plurality of sub-carriers;
applying beamforming weights for each antenna subgroup to beamform the data stream from the respective antenna subgroups to form beamformed multiple-input multiple-output (MIMO) channels; and
distributing power to the respective clusters for transmission by each of the antenna subgroups such that, for each antenna group, a particular cluster of the plurality of clusters is allocated more power than other clusters, such that the particular clusters of adjacent antenna subgroups are not the same, and such that the particular cluster that is allocated more power among the plurality of clusters transmitted from one antenna subgroup is not the same as the particular cluster that is allocated more power among the plurality of clusters transmitted from an adjacent antenna subgroup.

2. The method of claim 1, and further comprising encoding the data stream with a cyclic delay diversity (CDD) or precoding scheme.

3. The method of claim 1, wherein distributing comprises distributing power to the respective clusters so that, for each antenna group, approximately 90% of the power is allocated to the particular cluster and the remaining 10% of power is allocated to the remaining clusters.

4. The method of claim 1, and further comprising designating the particular cluster of the plurality of clusters for each of the antenna groups such that the particular cluster for one antenna group is different from that of an adjacent antenna group.

5. The method of claim 1, wherein distributing further comprises assigning power to the sub-carriers of each cluster in accordance with a predetermined weighting function that unequally allocates power among sub-carriers in each cluster.

6. The method of claim 5, wherein the predetermined weighting function is defined by a smooth curve.

7. The method of claim 5, wherein distributing comprises distributing power to sub-carriers of clusters so that power assigned to two adjacent sub-carriers that belong to two different clusters is the same.

8. An apparatus comprising:
a plurality of antennas arranged in antenna subgroups, wherein the antenna subgroups are configured to form virtual antennas;
an input processing module configured receive a data stream for transmission via each antenna group in a wireless channel comprising a plurality of clusters each comprising a plurality of sub-carriers;
an antenna grouping module configured to compute beamforming weight vectors for each of the antenna groups to create beamformed multiple-input multiple-output (MIMO) channels; and
a channel clustering module configured to distribute power to the respective clusters for transmission by each of the antenna subgroups such that, for each antenna group, a particular cluster of the plurality of clusters is allocated more power than other clusters, such that the particular clusters of adjacent antenna subgroups are not the same and such that the particular cluster that is allocated more power among the plurality of clusters transmitted from one antenna subgroup is not the same as the particular cluster that is allocated more power among the plurality of clusters transmitted from an adjacent antenna subgroup.

9. The apparatus of claim 8, wherein the input processing module is configured to encode the data stream transmitted by a virtual antenna with a cyclic delay diversity or pre-coding scheme.

10. The apparatus of claim 8, wherein the channel clustering module is configured to distribute power to the respective clusters so that, for each antenna group, approximately 90% of the power is allocated to the particular cluster and the remaining 10% of power is allocated to the remaining clusters.

11. The apparatus of claim 8, wherein the channel clustering module is configured to designate the particular cluster of the plurality of clusters for each of the antenna groups such that the particular cluster for one antenna group is different from that of an adjacent antenna group.

12. The apparatus of claim 8, wherein the channel clustering module is further configured to assign power to the sub-carriers of each cluster in accordance with a predetermined weighting function that unequally allocates power among sub-carriers in each cluster.

13. The apparatus of claim 12, wherein the predetermined weighting function is defined by a smooth curve.

14. The apparatus of claim 12, wherein the channel clustering module is further configured to distribute power to sub-carriers of clusters so that power assigned to two adjacent sub-carriers that belong to two different clusters is the same.

\* \* \* \* \*